United States Patent
Chen et al.

(10) Patent No.: US 11,976,961 B2
(45) Date of Patent: May 7, 2024

(54) TRANSDUCER TRANSFER IMPEDANCE CALIBRATION DEVICE BASED ON SPATIAL FREQUENCY DOMAI SMOOTHING TECHNOLOGY

(71) Applicant: Zhejiang University, Hangzhou (CN)

(72) Inventors: Yi Chen, Hangzhou (CN); Liuqing Yang, Hangzhou (CN); Xiaofeng Jin, Hangzhou (CN); Guanghui Jia, Hangzhou (CN); Han Zhao, Hangzhou (CN)

(73) Assignee: Zhejiang University, Hangzhou (CN)

( * ) Notice: Subject to any disclaimer, the term of this patent is extended or adjusted under 35 U.S.C. 154(b) by 759 days.

(21) Appl. No.: 16/861,218

(22) Filed: Apr. 29, 2020

(65) Prior Publication Data

US 2020/0378825 A1 Dec. 3, 2020

(51) Int. Cl.
| | |
|---|---|
| *G01H 15/00* | (2006.01) |
| *G01S 11/14* | (2006.01) |
| *G01V 1/18* | (2006.01) |
| *G01V 1/30* | (2006.01) |

(52) U.S. Cl.
CPC .............. *G01H 15/00* (2013.01); *G01S 11/14* (2013.01); *G01V 1/186* (2013.01); *G01V 1/30* (2013.01)

(58) Field of Classification Search
CPC ........ G01H 15/00; G01S 11/14; G01V 1/186; G01V 1/30
See application file for complete search history.

(56) References Cited

U.S. PATENT DOCUMENTS 5,825,894 A * 10/1998 Shennib ............... H04R 29/001
381/60

OTHER PUBLICATIONS

AEIsaev, COOMET.AUV.W-S1supplementary comparisonoffree—field hydrophone calibrations in the frequency range 250Hz to 8kHz (Year: 2015).*

* cited by examiner

*Primary Examiner* — Isam A Alsomiri
*Assistant Examiner* — Abdallah Abulaban

(57) ABSTRACT

A transfer impedance calibration device for transducers based on spatial frequency domain smoothing technology is provided. The calibration device comprises a signal transmitter, a power amplifier, a transducer pair, a measurement amplifier, a signal collector, a measurement processor and a current sampler. The device extracts acoustic channel information through the sound filed spatial information or measurement method to design a spatial domain smoothing filter, and then comprehensively processes the transmitted current signal and the received signal through the spatial frequency domain smoothing technology to obtain the transfer impedance of the transducer pair.

5 Claims, 4 Drawing Sheets

TRANSDUCER TRANSFER IMPEDANCE CALIBRATION DEVICE BASED ON SPATIAL FREQUENCY DOMAI SMOOTHING TECHNOLOGY

CROSS-REFERENCE TO RELATED APPLICATIONS

This application claims priority to Chinese Patent Application No. 201910470645.4, filed on May 31, 2019, entitled "TRANSDUCER TRANSFER IMPEDANCE CALIBRATION DEVICE BASED ON SPATIAL FREQUENCY DOMAI SMOOTHING TECHNOLOGY", which is hereby incorporated by reference.

TECHNICAL FIELD

This disclosure belongs to the technical field of acoustic measurement and testing, and particularly relates to a transfer impedance calibration device for transducers based on spatial frequency domain smoothing technology.

BACKGROUND

The transfer impedance of a transducer refers to the electrical transfer impedance under the combination of the transmitting transducer and the receiving hydrophone, that is, the ratio of the open circuit voltage across the hydrophone to the input current of the transmitting transducer. The transfer impedance is often used in the reciprocal calibration of transducers, and the accuracy of its measurement results directly affects the credibility of the transducer calibration results. Therefore, the calibration of transducer transfer impedance is a crucial issue in acoustic metrology.

The transfer impedance calibration of the transducer is usually carried out under the sound pressure field or free field conditions. However, it is difficult to obtain an ideal free field condition in actual calibration test. Even in the laboratory conditions, the anechoic pool (or anechoic room) is limited by the space size, and its noise attenuation effect is poor in the low frequency band. In such condition, the anechoic pool cannot overcome the influence of the reflection of the cell wall and the interface. Accordingly, it is necessary to use signal processing to achieve free field calibration. At present, signal processing methods include acoustic pulse transient suppression technology, Prony spectrum analysis technology, multi-path modeling, complex moving weighted averaging (CMWA) algorithm, etc. Acoustic pulse transient suppression technology is to stimulate a specific transient suppression voltage signal to the transducer, so that the initial transient and terminating transient of the transducer emission signal are effectively suppressed.

However, the acoustic pulse transient suppression technology requires the suppressed voltage signal has at least 2-3 steady-state waves in free field conditions. Prony spectrum analysis technology is to express the signal as a form of an exponential function with similar characteristics to the transient process of the transducer. By estimating the model parameters, the entire signal waveform is calculated from the short-time sampling data, so it has a very high frequency resolution, and can effectively expand the measurement low frequency limit of the limited spatial sound field. The multi-path modeling technology represents the multi-path signal received by the hydrophone (e.g. microphone) as a superposition of a series of exponential functions. After transformation, the modeling expression of the multi-path signal is obtained. The estimated values of the parameters of a series of exponential functions. The first signal of the exponential function corresponds to the direct wave signal. Like Prony spectrum, multipath modeling technology is a modern spectrum estimation algorithm, but these two algorithms are very sensitive to noise. When the signal-to-noise is low, there is a large error between the estimated value of the parameter and the true value; furthermore, Prony spectrum analysis technology and multi-path modeling technology are usually used to process single-frequency signal. Since the algorithm is complicated, and the calculation amount is large, they are lacking work efficiency.

SUMMARY OF THIS INVENTION

In view of the above, the present disclosure provides a transfer impedance calibration device for transducers based on the spatial frequency domain smoothing technology, which combines the spatial information of the sound field to comprehensively process the transmitted signal and the received signal, which can effectively reduce or eliminate the influence of reflection wave. The provided device has the advantages of simple algorithm, small calculation amount, which can greatly improve the test efficiency of the transducer and is suitable for most types of broadband signals.

The transfer impedance calibration device for transducers based on the spatial frequency domain smoothing technology comprises:

a signal transmitter, which is configured for generating broadband pulse signal (e.g. chirp signal, Gaussian pulse signal, broadband narrow pulse, sinc signal and noise signal);

a power amplifier, which is configured for amplifying the power of the broadband pulse signal and has impedance matching function;

a current sampler, which is configured for sampling the broadband pulse signal after power amplification and generating a corresponding electrical signal E2;

a transducer pair, which comprises a sound source and a hydrophone; the sound source is configured for emitting a broadband pulse acoustic signal underwater; wherein the acoustic signal reaches the hydrophone after transmitted by known channels; the hydrophone is configured for converting the acoustic signal into an electrical signal E1;

a measurement amplifier, which is configured for amplifying the power of the electrical signal E1;

a signal collector, which is configured for AD sampling the electrical signal E1 after power amplification and the electric signal E2; and a measurement processor, which is configured for calculating the transfer impedance of the transducer pair in the free field according to the electrical signal E1 and the electrical signal E2 sampled by the signal collector.

In some embodiments, a working bandwidth of the sound and the hydrophone must exceed the bandwidth of the broadband pulse signal.

In some embodiments, when arranging the sound filed, the sound source and the hydrophone are placed at a far field distance from each other, and the signal-to-noise ratio of the received signal of the hydrophone is higher than 20 dB.

In some embodiments, the measurement processor calculates the transfer impedance of the transducer pair in the free field. More specifically, the calculation includes the following steps. First, performing Hilbert transform on the power-amplified electrical signal E1; multiplying the obtained transformation result by the unit complex number; adding the result obtained by the transformation to the amplified electrical signal E1 after the result obtained by the transformation is multiplied by a unit complex number; and performing fast Fourier transform on the added result; similarly, performing Hilbert transform o the electrical signal E2; adding the result obtained by the transformation to the electrical signal E2 after the result obtained by the transformation is multiplied by a unit complex number; performing fast Fourier transform on the added result. Then, obtaining the transfer impedance of the transducer pair in non-free field by dividing the frequency spectrum corresponding to the electrical signal E1 with the frequency spectrum corresponding to the electrical signal E2. At last, the transfer impedance of the transducer pair in the free field is obtained by filtering the transfer impedance of the transducer pair in non-free field by using a spatial frequency domain smoothing filter.

In some embodiments, a construction process of the spatial frequency domain smoothing filter is as follows. First, calculating or measuring a time delay difference $\tau_i$ between different acoustic propagation channels and direct wave channel, where i is a natural number and $1 \leq i \leq N$, and N is the number of the acoustic propagation channel. Then, taking reciprocal of each time delay difference $\tau_i$ to obtain the corresponding bandwidth $\Delta f_i$; constructing multiple unit rectangular window functions according to each bandwidth $\Delta f_i$, wherein a length of each window function corresponds to $\Delta f_i$. At last, carrying out convolution operation on all unit rectangular window functions, and obtaining the spatial frequency domain smooth filter function, wherein the bandwidth of the spatial frequency domain smooth filter function is $$\Delta f = \sum_{i=1}^{N} \Delta f_i.$$

The acoustic propagation channel comprises interface or boundary reflection. The time delay difference between the different acoustic propagation channels and the direct wave channel may be obtained by calculating the sound path difference, or by measuring the high-frequency pulse signal transmitted by the sound source.

The present disclosure extracts acoustic channel information through the sound filed spatial information or measurement method to design a spatial domain smoothing filter, and then comprehensively processes the transmitted current signal and the received signal through the spatial frequency domain smoothing technology to obtain the transfer impedance of the transducer pair. Compared with the prior art, the disclosure combines the spatial information of the sound field to comprehensively process the transmitted signal and the received signal in the frequency domain. This effectively reduces or eliminates the influence of the reflection wave, and expands the low limit the measurement frequency in the free field conditions. The present disclosure has simple algorithm, small calculation amount, and can greatly improves the test efficiency of the transducer, and is suitable for most types of broadband signal.

DETAILED DESCRIPTION OF THE DISCLOSURE

In order to specify the present disclosure, the present disclosure will be described in detail below with reference to the drawings and specific embodiments.

The transducer transfer impedance calibration device based on the spatial frequency domain smoothing technology of the present discourse extracts the acoustic channel information through the sound field spatial information through the sound filed spatial information or measurement method to design a spatial domain smoothing filter, and comprehensively processes the transmitted current signal and the received signal by the spatial domain smoothing technology, and therefore obtaining the transfer impedance of the transducer pair. Accordingly, the calibration device mainly comprises a signal transmitter, a power amplifier, a transducer pair, a measurement amplifier, a signal collector, a current sampler and a measurement processor.

Figure 1:
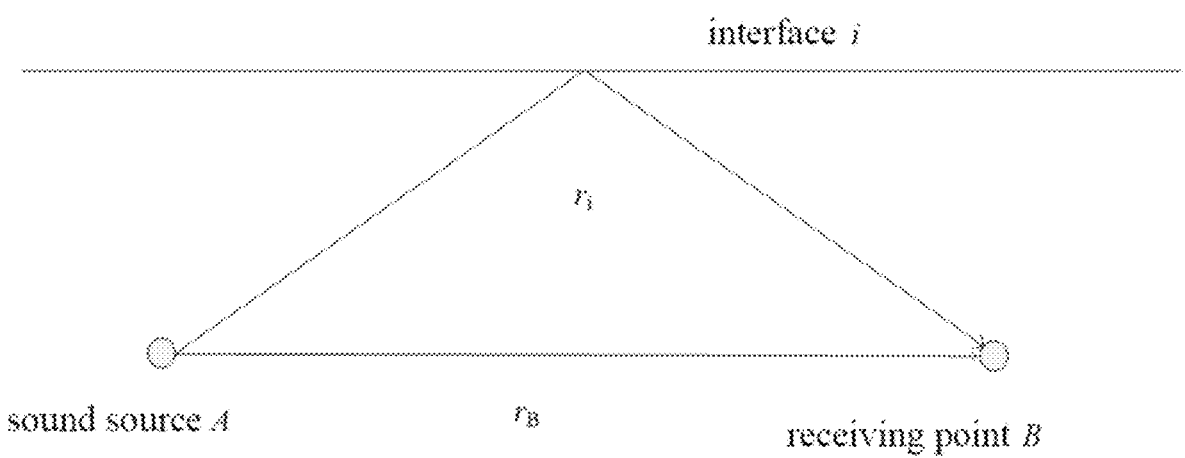
FIG. 1 is a schematic diagram of the reflection wave and the direct wave in ith interface.

The acoustic propagation channel comprises interface or boundary reflection. As shown in FIG. 1, the time delay difference between the different acoustic propagation channels and the direct wave channel may be obtained by calculating the sound path difference, or by measuring the high-frequency pulse signal transmitted by the sound source.

The design method of the spatial domain smoothing filter comprise the following steps. Step 1, calculating or measuring a time delay difference $\tau_i$ between different acoustic propagation channels and direct wave channel; Step 2, taking reciprocal of each time delay difference $\tau_i$ to obtain the corresponding bandwidth $\Delta f_i$; constructing multiple unit rectangular window functions according to each bandwidth $\Delta f_i$; Step 3, carrying out convolution operation on all unit rectangular window functions, and obtaining the spatial frequency domain smooth filter.

The bandwidth of the spatial frequency domain smooth filter is $$\Delta f = \sum_{i=1}^{N} \Delta f_i.$$

The valid bandwidth measured is $$\left[ f_L - \frac{\Delta f}{2}, f_H - \frac{\Delta f}{2} \right],$$

which represents that the bandwidth of the transmitted signal is greater than the bandwidth of the spatial function filter. Wherein, $f_L$ and $f_H$ represent the upper limit frequency and the lower limit frequency, respectively.

The signal generated by the signal transmitter includes: chirp signal, Gaussian pulse signal, broadband narrow pulse, sine signal and noise signal. The transmitted signal is a pulse signal, and the generated signal is a pulse signal. The power amplifier is configured for power amplification of the transmitted signal and has a function of impedance matching. The measurement amplifier is configured for amplifying the received signal. The current sampler is configured for measuring the transmitted current. The transducer is consisted of a sound source and a hydrophone (or microphone). The working frequency of the sound source and the hydrophone exceeds the bandwidth of the transmitted signal. When arranging the sound filed, the sound source are placed at a far field distance from each other, and the signal-to-noise ratio of the received signal of the hydrophone is higher than 20 dB. The measurement processor is configured for calculating the transfer impedance of the transducer pair according to the following formula:

$$Z(f_0) = \frac{1}{\Delta f} \int_{f_0 - \frac{\Delta f}{2}}^{f_0 + \frac{\Delta f}{2}} \frac{FFT(\hat{U}_{out}(t))}{FFT(\hat{I}(t))} W(f) dt$$

Figure 2:
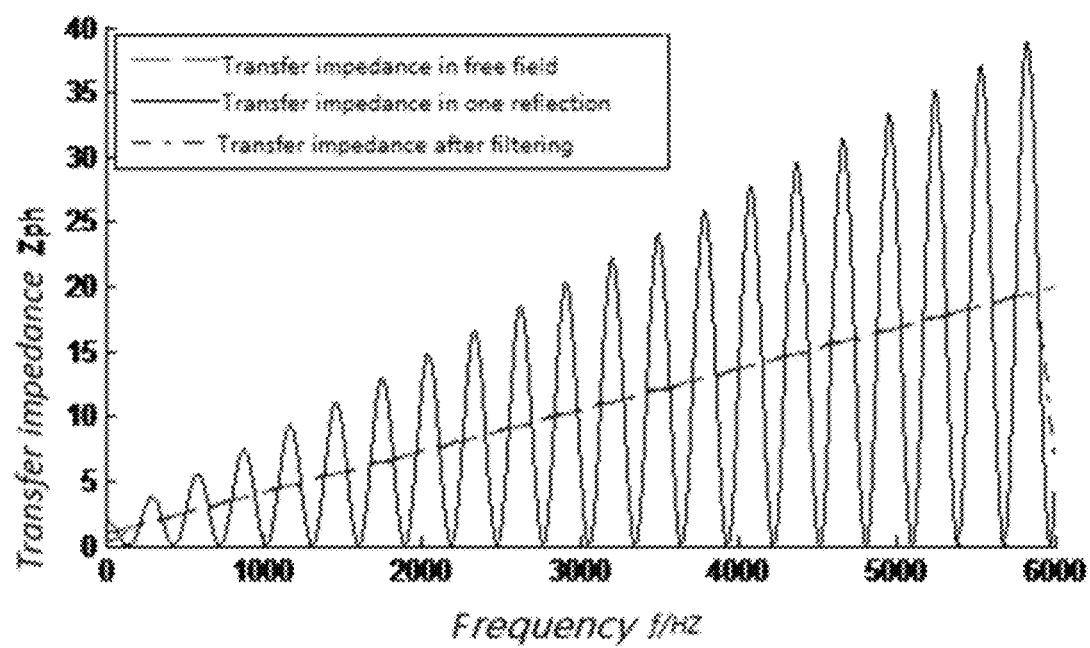
FIG. 2 is a simulation effect diagram of spatial frequency domain smoothing filter technology.

Where, $Z(f_0)$ is the transfer impedance of the transducer pair under free filed conditions; FFT is the fast Fourier transform; $\hat{U}_{out}(t)$ is the analytic expression of the received signal constructed by the Hilbert transform; $\hat{I}(t)$ is the analytic expression of the current signal constructed by the Hilbert transform; $W(f)$ is the spatial frequency domain smooth filter. The effect of being filtered is shown in FIG. 2, which suggests that the spatial frequency domain smoothing technology suppresses the interference of the reflection wave.

Figure 4:
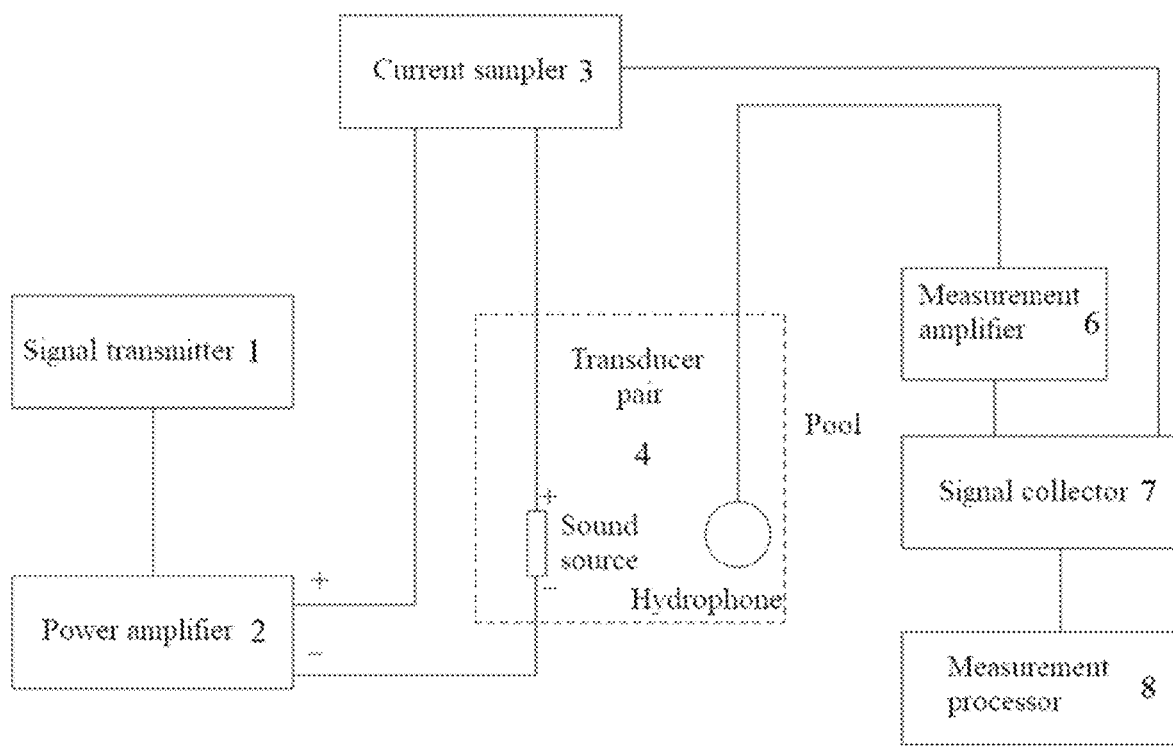
FIG. 4 is a schematic diagram of the transfer impedance calibration device for the transducer.

Referring to FIG. 4, the transfer impedance calibration device of the transducer based on the spatial frequency domain smoothing technology according to the present disclosure comprises a signal transmitter 1, a power amplifier 2, a current sampler 3, a transducer pair 4, a measurement amplifier 6, a signal collector 7 and a measurement processor 8. An input end of the transmitter 1 is connected to an output end of the power amplifier 2. A positive pole of an output end of the power amplifier 2 is connected to a positive pole of the sound source within the transducer pair 4 through the current sampler 3. A negative pole of the output end of the power amplifier 2 is connected to a negative pole of the sound source within the transducer pair 4 directly. An output signal of the current sampler 3 is connected to an output end of the signal collector 7 directly. The hydrophone within the transducer pair 4 is connected to an input end of the measurement amplifier 6. An output end of the measurement amplifier 6 is connected to an input end of the signal collector 7. An output end of the signal collector 7 is connected to an input end of the measurement processor 8.

Figure 3:
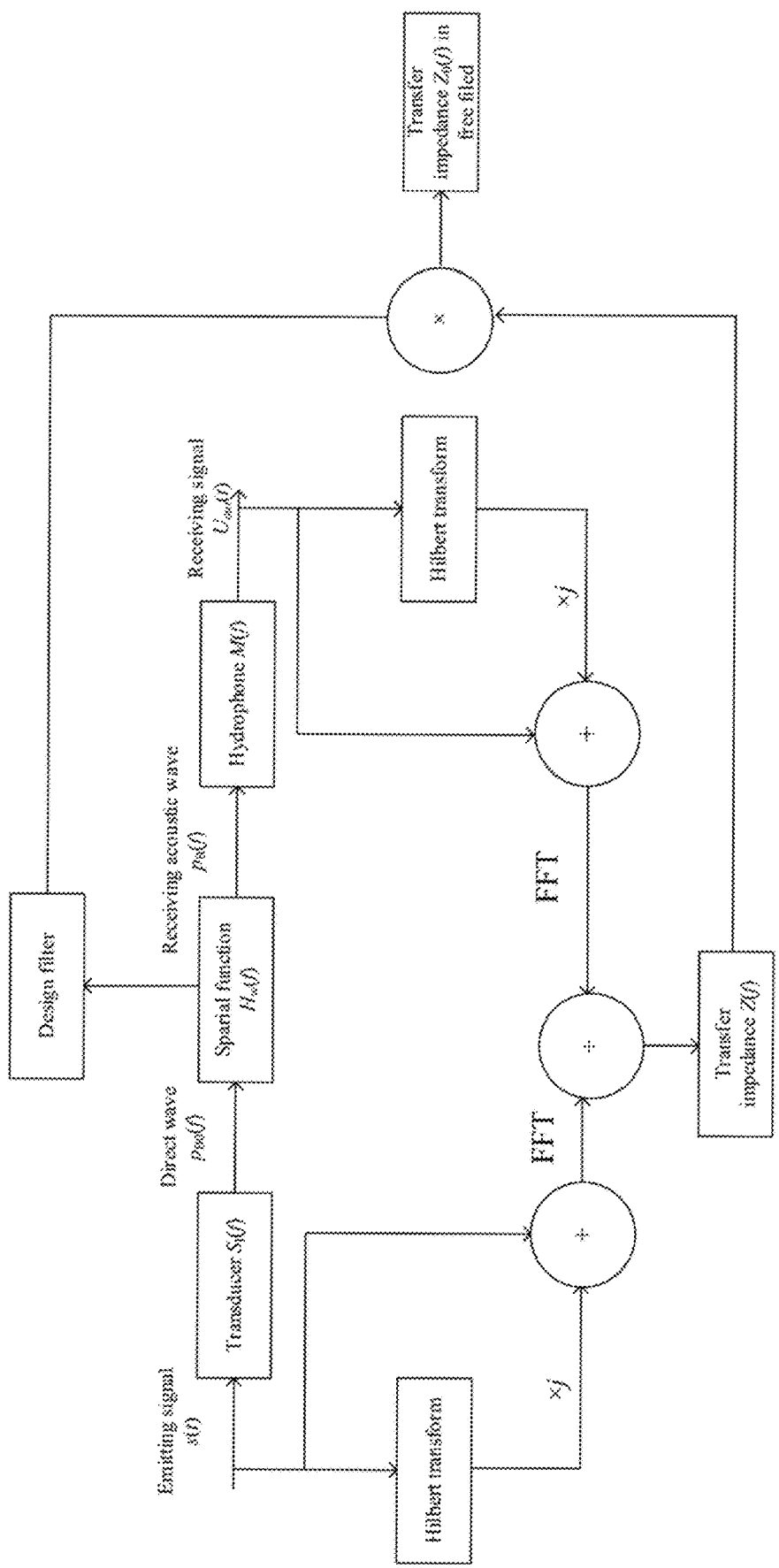
FIG. 3 is a block diagram of the signal processing of the spatial function filtering method of the measurement processor.

The measurement process of the transfer impedance using the aforementioned device is as flows: the signal transmitter 1 generates a broadband pulse signal; the broadband pulse signal is amplified by the power simplifier 2 and loaded on both ends of the sound source within the transducer pair 4; the current sampler 3 is utilized to obtain the transmitted current signal; the signal collector 7 performs AD sampling on the transmitted current signal to obtain a digital current signal I(t); the sound source transmits the acoustic wave signal; the acoustic wave signal reaches to the hydrophone via different channels; the measurement amplifier 6 amplifies the signal received by the hydrophone; the signal collector 7 performs AD sampling on the amplified signal to obtain the voltage signal U(t); the magnification K of the measurement amplifier is obtained; the voltage signal U(t) is divided by K to obtain the output signal $U_{out}(t)$ of the hydrophone. The process of signal processing of the measurement processor 8 is shown in FIG. 3, and more specifically:

(1) performing Hilbert transform on the transmitted current signal I(t) and the received signal $U_{out}(t)$ of the hydrophone:

$$\hat{I}(t) = \text{hilbert}(I(t))$$

$$\hat{U}_{out}(t) = \text{hilbert}(U_{out}(t))$$

where, $\hat{I}(t)$ and $\hat{U}_{out}(t)$ represents the results of Hilbert transformation on I(t) and $U_{out}(t)$, respectively; hilbert ( ) represents the Hilbert transform;

(2) constructing analytical signal by using signal and the Hilbert transform on the signal:

$$\dot{I}(t) = I(t) + j\hat{I}(t)$$

$$\dot{U}_{out}(t) = U_{out}(t) + j\hat{U}_{out}(t)$$

where, j represents imaginary unit; $\dot{I}(t)$ and $\dot{U}_{out}(t)$ are analytical signals of I(t) and $U_{out}(t)$, respectively;

(3) obtaining the complex transfer impedance Z(f) by performing Fourier transform on $\dot{I}(t)$ and $\dot{U}_{out}(t)$, and dividing the Fourier transformed $\dot{U}_{out}(t)$ by the Fourier transformed $\dot{I}(t)$:

$$Z(f) = \frac{FFT(\dot{U}_{out}(t))}{FFT(\dot{I}(t))}$$

(4) calculating the time delay $\tau$; between different channels and the direct wave channel according to the spatial information of the sound filed; taking reciprocal of each time delay $\tau_i$ to obtain the corresponding bandwidth $\Delta f_i$; constructing unit rectangular filters according to the bandwidth $\Delta f_i$; and designing the spatial frequency domain smooth filter; the expression of the spatial frequency domain smooth filter is as follows:

$$W(f) = \text{rect}(\Delta f_1) \otimes \text{rect}(\Delta f_2) \otimes \cdots \otimes \text{rect}(\Delta f_n)$$

where, $\text{rect}(\Delta f_i)$ represents the unit rectangular window with a length of $\Delta f_i$; $\otimes$ represents convolution operation;

(5) performing smooth processing on the complex transfer impedance to obtain the transfer impedance $Z_0(f)$ under the free field:

$$Z_0(f_0) \approx \frac{1}{\Delta f} \int_{f_0 - \frac{\Delta f}{2}}^{f_0 + \frac{\Delta f}{2}} Z(f) W(f) df$$

FIG. 2 is a simulation effect diagram of spatial frequency domain smoothing filter technology. In FIG. 2, the transfer impedance processed by the frequency domain smoothing technology in valid bandwidth is substantially consistent with the transfer impedance in the free field. Accordingly, the calibration device of the present disclosure can be used in transfer impedance calibration for transducer, and is able to suppresses the influence of the reflection wave, realizing the free filed calibration for the transfer impedance.

The above description of the embodiments is to facilitate those of ordinary skill in the art to understand and apply the present disclosure. It is obvious that those skilled in the art can easily make various modifications to the above-mentioned embodiments, and apply the general principles described here to other embodiments without creative work. Therefore, the present disclosure is not limited to the above-mentioned embodiments. According to the present disclosure, those equivalents or modifications made to the present invention in the spirit of the present disclosure shall be deemed in the scope of the present invention.

What is claimed is:

1. A transfer impedance calibration device for transducers based on a spatial frequency domain smoothing technology comprising:
   a signal transmitter, configured for generating broadband pulse signal;
   a power amplifier, configured for power amplification for the broadband pulse signal and comprises impedance matching function;
   a current sampler, configured for sampling the broadband pulse signal after power amplification and generating a corresponding electrical signal E2;
   a transducer pair, which comprises a sound source and a hydrophone; the sound source is configured for emitting a broadband pulse acoustic signal underwater; wherein the acoustic signal reaches the hydrophone after transmitted by channels; the hydrophone is configured for converting the acoustic signal into an electrical signal E1;
   a measurement amplifier, configured for amplifying the power of the electrical signal E1;
   a signal collector, configured for AD sampling the electrical signal E1 after power amplification and the electric signal E2; and
   a measurement processor, configured for calculating a transfer impedance of the transducer pair in the free field according to the electrical signal E1 and the electrical signal E2 sampled by the signal collector;
   wherein the transfer impedance of the transducer pair in the free field is calculated by the measurement processor calculates; wherein the calculation comprises the following steps:
   performing Hilbert transform on the power-amplified electrical signal E1; multiplying the obtained transformation result by the unit complex number; adding the result obtained by the transformation to the amplified electrical signal E1 after the result obtained by the transformation is multiplied by a unit complex number; and performing fast Fourier transform on the added result;
   performing Hilbert transform o the electrical signal E2; adding the result obtained by the transformation to the electrical signal E2 after the result obtained by the transformation is multiplied by a unit complex number; performing fast Fourier transform on the added result;
   obtaining the transfer impedance of the transducer pair in non-free field by dividing the frequency spectrum corresponding to the electrical signal E1 with the frequency spectrum corresponding to the electrical signal E2
   obtaining the transfer impedance of the transducer pair in the free field by filtering the transfer impedance of the transducer pair in non-free field by using a spatial frequency domain smoothing filter.

2. The transfer impedance calibration device according to claim 1, wherein the broadband pulse signal is at least one selected from the group consisting of chirp signal, Gausses pulse signal, broadband narrow pulse, sinc signal and noise signal.

3. The transfer impedance calibration device according to claim 1, wherein when arranging the sound filed, the sound source and the hydrophone are placed at a far field distance from each other, and the signal-to-noise ratio of the received signal of the hydrophone is greater than 20 dB.

4. The transfer impedance calibration device according to claim 1, wherein a construction process of the spatial frequency domain smoothing filter is as follows:
   calculating or measuring a time delay difference $\tau_i$ between different acoustic propagation channels and direct wave channel, where i is a natural number and $1 \leq i \leq N$, and N is the number of the acoustic propagation channel;
   taking reciprocal of each time delay difference $\tau_i$ to obtain the corresponding bandwidth $\Delta f_i$; constructing multiple unit rectangular window functions according to each bandwidth $\Delta f_i$, wherein a length of each window function corresponds to $\Delta f_i$;
   carrying out convolution operation on all unit rectangular window functions, and obtaining the spatial frequency domain smooth filter function, wherein the bandwidth of the spatial frequency domain smooth filter function is $$\Delta f = \sum_{i=1}^{N} \Delta f_i.$$

5. The transfer impedance calibration device according to claim 4, wherein the acoustic propagation channel comprises interface or boundary reflection; The time delay difference between the different acoustic propagation channels and the direct wave channel is obtained by calculating the sound path difference, or by measuring the high-frequency pulse signal transmitted by the sound source.

* * * * *